(12) United States Patent
Strobel et al.

(10) Patent No.: US 6,913,425 B1
(45) Date of Patent: Jul. 5, 2005

(54) METHOD FOR MAKING DIE BOARDS AND MATERIALS AND APPARATUS FOR PRACTICING THE METHOD

(75) Inventors: Wolfgang M. Strobel, Tolland, CT (US); David J. Logan, Great Barrington, MA (US); David J. Gerber, Avon, CT (US)

(73) Assignee: Gerber Scientific Products, Inc., Manchester, CT (US)

( * ) Notice: Subject to any disclaimer, the term of this patent is extended or adjusted under 35 U.S.C. 154(b) by 159 days.

(21) Appl. No.: 09/558,575

(22) Filed: Apr. 26, 2000

Related U.S. Application Data

(62) Division of application No. 09/271,416, filed on Mar. 17, 1999, now Pat. No. 6,170,376.

(51) Int. Cl.[7] ................................................ B23C 5/00
(52) U.S. Cl. ............................................. 407/53; 407/55
(58) Field of Search ........................... 407/53, 57, 54, 407/55, 63, 58, 59; 408/224, 229, 230

(56) References Cited

U.S. PATENT DOCUMENTS

| | | | |
|---|---|---|---|
| 3,059,506 A | | 10/1962 | Linzell et al. |
| 3,322,004 A | | 5/1967 | Wolfe |
| 4,052,886 A | | 10/1977 | Buick |
| 4,226,143 A | | 10/1980 | Whitecotton et al. |
| 4,449,865 A | * | 5/1984 | Yankovoy et al. ........... 408/1 R |
| 4,507,028 A | * | 3/1985 | Matsushita ................... 408/230 |
| 4,610,581 A | * | 9/1986 | Heinlein ...................... 409/132 |
| 4,662,803 A | * | 5/1987 | Arnold ......................... 408/224 |
| 4,669,933 A | * | 6/1987 | Dye ............................. 409/136 |
| 4,936,721 A | * | 6/1990 | Meyer .......................... 408/224 |
| 5,035,552 A | * | 7/1991 | Lysenko et al. ............. 408/230 |
| 5,140,872 A | | 8/1992 | Holliday et al. |
| 5,570,978 A | * | 11/1996 | Rees et al. ................... 408/144 |
| 5,642,970 A | * | 7/1997 | Yamaguchi et al. ......... 409/132 |
| 5,816,753 A | * | 10/1998 | Hall ............................. 408/224 |
| 5,823,720 A | * | 10/1998 | Moore .......................... 408/204 |
| 6,007,276 A | * | 12/1999 | Wardell ......................... 407/54 |
| 6,290,438 B1 | * | 9/2001 | Papajewski ................. 408/145 |

* cited by examiner

Primary Examiner—Henry W. H. Tsai
(74) Attorney, Agent, or Firm—Morgan & Finnegan, LLP

(57) ABSTRACT

In a die board for cutting and/or creasing sheet-type work material, a base is provided that includes a first upper surface and a second lower surface. At least one slot extends along the first upper surface and includes a first slot section extending from said first upper surface at least part-way through the die board base. The at least one slot also includes a second slot section extending from said second lower surface at least part-way through the die board base. The first and second slot sections each have a width with at least one of the slot section widths being adapted to grip and retain at least one die-board rule.

3 Claims, 4 Drawing Sheets

METHOD FOR MAKING DIE BOARDS AND MATERIALS AND APPARATUS FOR PRACTICING THE METHOD

CROSS REFERENCE TO RELATED APPLICATION

This application is a divisional of U.S. patent application Ser. No. 09/271,416 entitled METHOD FOR MAKING DIE BOARDS, AND MATERIALS AND APPARATUS FOR PRACTICING THE METHOD, filed on Mar. 17, 1999 now U.S. Pat. No. 6,170,376.

FIELD OF THE INVENTION

The present invention is generally directed to die boards for use in cutting and creasing sheet-type work materials, and is more specifically directed to a method for fabricating a die board using a rotary cutting tool, and to the materials used in said fabrication.

BACKGROUND OF THE INVENTION

Die boards are generally used to cut and/or crease one or more layers of sheet-type work material, such as cardboard, for use in the manufacture of various different articles. One such use, given here by way of example and not to be construed as limiting the present invention, is the fabrication of box and package blanks which after having been cut and creased by the die board, can be folded into finished boxes or product packages.

Usually, the die board consists of a base made from a thick piece of material such as plywood, that has a series of slots cut into it. These slots are arranged in a pattern corresponding, for example, to the outer periphery of a box or package blank, and the lines along which the blank must be folded to create the finished box or package. Rules, which generally consist of pieces of steel cut to lengths and/or bent to correspond to the slot length and configurations in the base, are then inserted into and protrude from the slots. The amount by which a particular rule extends from the slot depends on whether the rule will be employed to cut or crease the sheet material. Generally, during a cutting and creasing operation, the sheet material is positioned under the die board and pressure is applied to the board via a press, causing the rules to engage the sheet material, thereby cutting and creasing the sheet material.

In known methods of fabricating die boards, difficulties are often associated with the formation of the slots that must be cut into the die board base to accommodate the rules. Typically these slots are cut into the base in one of two ways; (1) using lasers, or (2) using a jig or band saw. The capital cost of a laser is generally very high, in addition, the use of lasers tends to be expensive and complex. Large amounts of power is required to operate the laser, and the beam must typically be shielded using an inert gas. Another difficulty associated with using lasers is that the slots produced tend to have scalloped edges. When the rules are inserted into these slots, rather than having line contact between the slot edges and the rules; the rules engage the slot edges at discreet points corresponding to the "peaks" of the scalloped edge. This reduces the stability of the rule in the die-board, increasing the potential for inaccurate cutting and creasing when the die board is used. This problem is further exacerbated due to the fact that the heat associated with the laser tends to dry out the board resulting in dimensional distortion of the slots being cut and warping of the board. A further problem also attributable to the heat of the laser is that smoke is generated from the material being cut. The smoke causes environmental problems which must be addressed, resulting in further increases in operating expense.

When a jig or band saw is employed, a starting hole must be drilled at one end of the slot to facilitate insertion of the blade associated with the saw. This requires an additional operation, thereby adding to the cost associated with fabricating the die board. Furthermore, these slots are often cut by hand with the inaccuracies resulting from human error making it difficult to insert the die board rules into the slots. The potential human error can also result in inaccurate die cutting. In addition, when using a manual process, the cut lines must be transferred by hand onto the die board.

Based on the foregoing, it is the general object of the present invention to provide a die board and a method for manufacturing the die board that overcomes the difficulties and drawbacks associated with prior art die boards and their manufacture.

It is a more specific object of the present invention to provide a die board fabricated using rotary cutting tools that is not subject to the above-described inaccuracies.

SUMMARY OF THE PRESENT INVENTION

The present invention is directed to a die board for cutting and/or creasing sheet-type work material that includes a die board base having a first upper surface and a second lower surface. At least one slot extends along the upper surface and through the thickness of the die board base. The slot has a first slot section extending from the first upper surface at least part-way through the die board and having a first slot width at the first upper surface. The slot also includes a second slot section extending from the second lower surface at least part-way through the die board's thickness and having a second slot width. Preferably, the second slot width is smaller than the first slot width and is adapted to receive and grippingly retain a die board rule. However, the present invention is not limited in this regard as the widths of the first and second slots can also be equal.

In one embodiment of the present invention the die board base is a laminate that includes a first layer of die board material and at least a second layer of die board material. The first layer of die board material includes a third lower surface bonded via an adhesive to a fourth upper surface defined by the second layer. The above-described slot configuration is employed in this embodiment with the second slot section extending through the second layer of die board material. However, the present invention is not limited in this regard as the first slot section can extend through the first and into the second layer of die board material without departing from the broader aspects of the present invention.

Preferably, the second slot section extends through the second layer of die board material, part-way into the first layer of die board material. It is also preferable that the third lower surface of the first layer of die board material have such release characteristics relative to the fourth upper surface of the second layer of die board material that the second layer can be separated from the first layer. In this manner, the adhesive remains bonded to the second layer of die board material, leaving the first layer virtually free of adhesive. Once the second layer of die board material has been separated from the first layer, it can then be attached to the first upper surface, such that the slots in the first and second layers are aligned. Accordingly, when the die board rules are inserted into the die board, the rules are grippingly retained by the slots in the second layer of die board material, as well as by the second slot sections in the first layer of die board material. Retaining the rules at the upper and lower surfaces of the die board has the advantage of increasing the stability of the rule during operation such that rule deflection is minimized.

While the die board has been described above as including first and second layers of die board material, the present invention is not limited in this regard, as any number of layers of die board material can be stacked one-on-top-of the-other. Moreover, the configuration of the slots can be the same for each layer of die board material, or it can vary. For example, a three layer die board construction can be employed where each slot in each layer includes the above-described first and second slot sections. Conversely, the first and third layers could include only the second slot sections which are adapted to grippingly retain the die board rules, while the second layer of die board material includes only the first slot section that is wider than the second slot section.

The present invention also resides in a method for fabricating a die board wherein a die board base is provided having a first upper surface and a second lower surface. An apparatus, such as, but not limited to a milling machine or router, is also provided to cut the slots in the die board base and utilizes at least one rotary cutting tool. During the die board fabrication process, the die board base is presented to the apparatus which is operated to cause the cutting tool or tools to engage the base. The slots for receiving the die board rules are cut such that each slot includes an upper slot section having a first width, and a lower slot section having a second width that is less than the first width and sized to grippingly retain at least one die board rule therein.

More than one rotary cutting tool can by used to cut the slots into the die board base, however, the present invention is not limited in this regard. For example, a single stepped cutter having an upper cutting portion defining a diameter corresponding to the upper slot width, and a lower tip portion having a diameter corresponding to the second slot width could be used. The cutter could also employ a tapered transition region between the upper cutting portion and the tip portion. While rotary cutting tools have been described, the present invention is not limited in this regard as other cutting methods such as sawing, employing a laser, or using a high-pressure water jet can also be utilized without departing from the broader aspects of the present invention.

The die board base fabricated using the above-described method can also be a laminate comprised of two or more layers of die board material bonded together. In this case, the method would include the steps of cutting the slots into each layer either simultaneously, or one-at-a-time, and then assembling the respective layers, preferably by bonding the layers of die board material together.

DETAILED DESCRIPTION OF THE PREFERRED EMBODIMENTS

Figure 1:
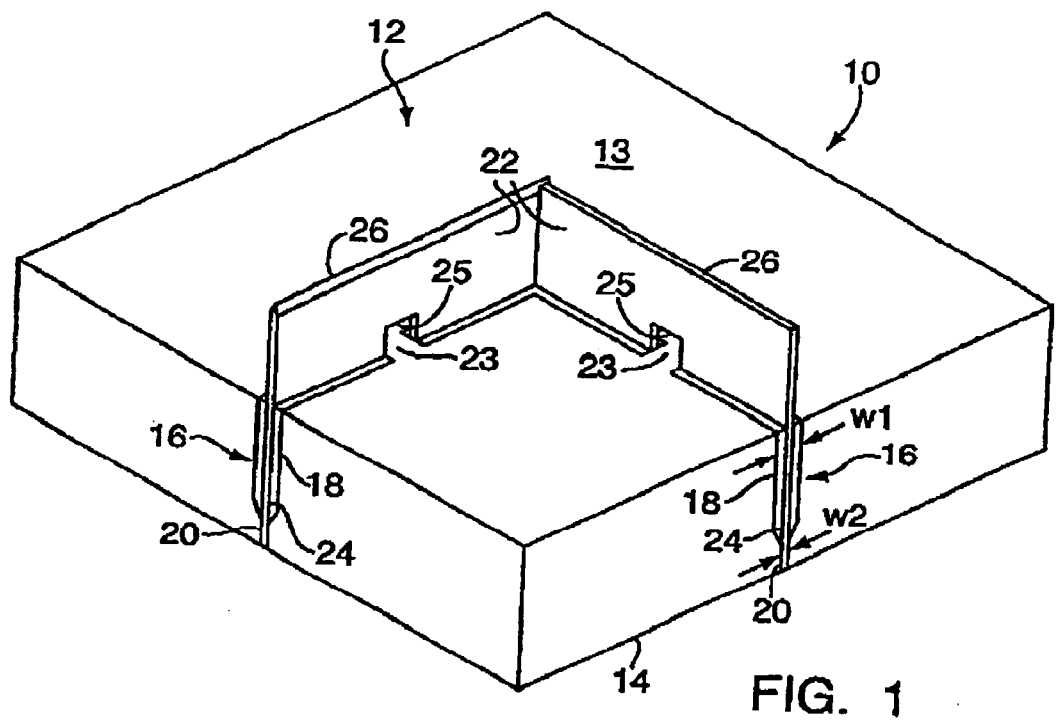
FIG. 1 is a perspective view of an embodiment of the die board of the present invention.

As shown in FIG. 1, an embodiment of the die board for cutting and or creasing sheet type work material, of the present invention is generally designated by the reference number 10 and is useful in cutting package blanks from sheet type work material. The die board includes a die board base 12 made from a suitable material, such as, but not limited to wood, or plastic, and has a first upper surface 13 and a second lower surface 14. In addition, the die board base 12 includes one or more slots 16 extending through the thickness of the die board base, and arranged in a predetermined pattern corresponding to the shape of a blank to be cut using the die board.

The slots 16 include a first slot section 18 extending from the first upper surface 13 part way through the thickness of the die board base and defining a first width labeled "w1". A second slot section 20 extends from the first slot section 18 to the second lower surface 14, and defines a second slot width labeled "w2" that is smaller than the first slot width. A die board rule 22 is positioned in each slot 16, and defines an edge portion 24 that is pressed into the second slot section 20 such that the die board rule is grippingly retained therein. The die board rule 22 also defines a tip portion 26 projecting outwardly from the first upper surface 12 and adapted to engage and cut or crease the work material. However, the present invention is not limited in this regard as the tip portion 26 of the die board rule can also extend from the second lower surface without departing from the broader aspects of the present invention. While the die board 10 shows only two slots 16 and two die board rules 22, the present invention is not limited in this regard as any number of slots and die board rules arranged in an infinite number of patterns can be employed without departing from the broader aspects of the present invention. In addition, the die board 10 includes bridges 23 defined by the die board base, that extend between in inner and outer periphery determined by the configuration of the blank being cut and/or creased by the die board. The bridges 23 extend through gaps 25 in the die board rules 22 and prevent the die board from having any unsupported areal sections that could potentially separate from the die board base during operation. While the widths w1 and w2 have been shown and described as being different, the present invention is not limited in this regard as w1 can approximately equal w2 without departing from the broader aspects of the present invention.

Figure 2:
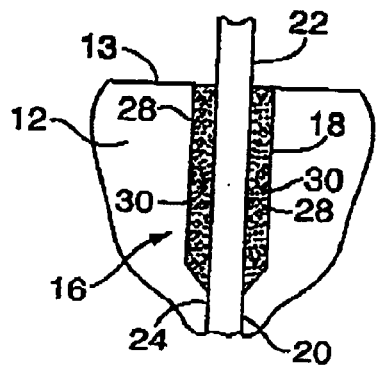
FIG. 2 is an enlarged front view of a slot cut into the die board of FIG. 1 showing an upper slot section filled with a filler material for preventing deflection during operation of a die board rule positioned in the slot.
Figure 3:
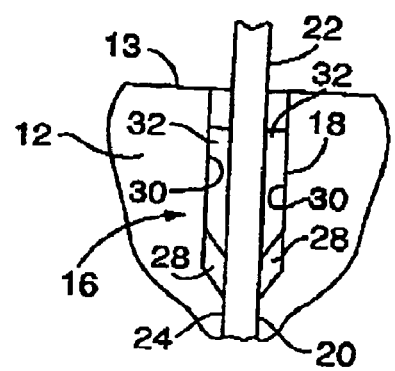
FIG. 3 is an enlarged front view of a slot cut into the die board of FIG. 1 showing an upper slot having spacers located therein for preventing deflection during operation of a die board rule positioned in the slot.

As shown in FIG. 2, cavities 28 are formed between the die board rule 22 and the side walls 30 that define the first slot section 18. The cavities 30 are filled with a suitable filler material, such as, but not limited to epoxy, to prevent the die board rules from deflecting during operation of the die board 10. Alternatively, and as shown in FIG. 3, the spacers 32 can be positioned in the cavities 28 engaging the side walls 30 and the die board rule 22, thereby securing the die board rule in the slot 16.

Figure 4:
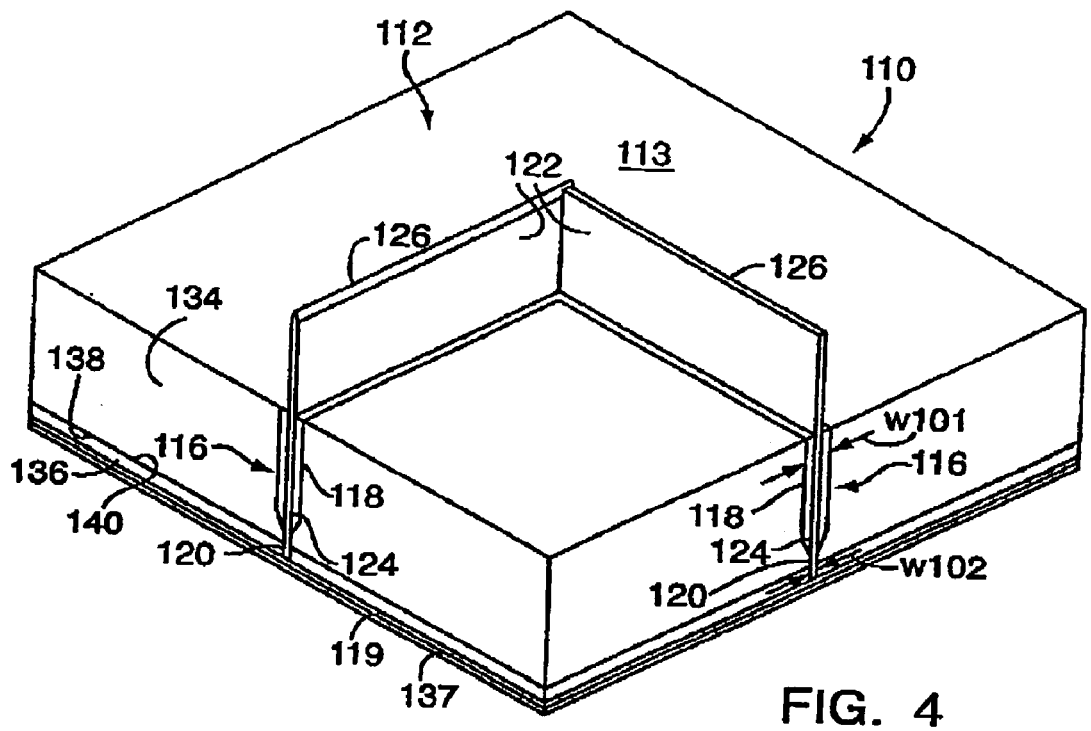
FIG. 4 is a perspective view of an embodiment of the die board of the present invention wherein the die board base is comprised of a laminate having first and second layers of die board material.
Figure 5:
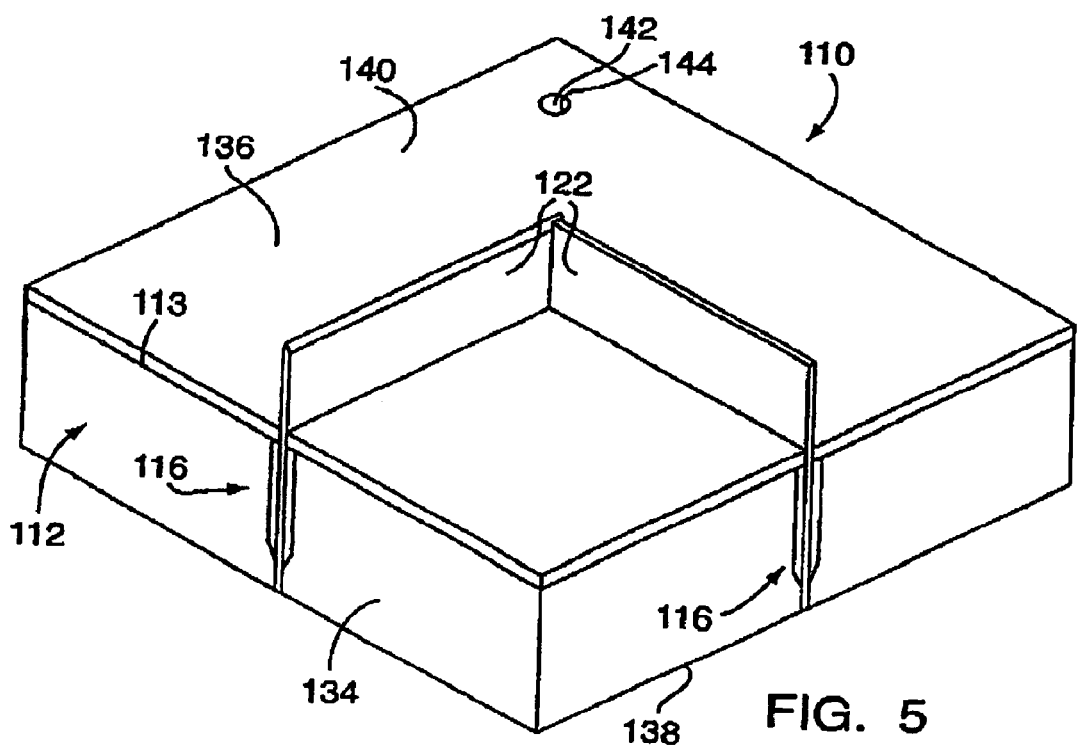
FIG. 5 is a perspective view of the die board of FIG. 4 showing the second layer of die board material positioned on an upper surface of the first layer of die board material.

A second embodiment of the die board of the present invention, shown in FIG. 4, is generally designated by the reference numeral 110. The die board 110 is similar in many respects to the die board 10 described above, and therefore like reference numerals preceded by the number 1 are used to indicate like elements. The die board 110 differs from the die board 10 in that the die board base 112 is a laminate having first and second layers of die board material, 134 and 136 respectively. The first layer of die board material 134 includes a third lower surface 138 bonded to a fourth upper surface 140, defined by the second layer of die board material 136 via a layer of adhesive (not shown). The adhesive can be any one of a number of different thermoset or thermoplastic adhesives, such as epoxies, or the adhesive can be of the pressure sensitive type.

Still referring to FIG. 4, the slots 116 are the same as described above with reference to the die board 10. In this instance the second slot section 120 extends through the second layer of die board material 136 and part-way into the first layer of die board material 134. However, the present invention is not limited in this regard as the second slot section could extend only through the second layer of die board material 136.

One of the third lower surface 138 or the fourth upper surface 140 can have such release characteristics relative to the layer of adhesive, as to allow the first and second layers of die board material to be separated. Alternatively the adhesive layer can consist of a low-tack adhesive which allows for easy separation of the layers of die board material. Once the layers are separated, the second layer of die board material can then be bonded to the first upper surface 113 defined by the first layer of die board material 134, such that the slots in the first and second layers of die board material are substantially aligned. In this manner, the die board rules 122 when received in the slots 116 are grippingly retained by the first and second layers of die board material 134 and 136 respectively. To facilitate the bonding of the first and second layers of die board material, a layer of pressure sensitive adhesive 119 can be bonded to the second layer of die board material 136, and can include a layer of release material 137 adhered thereto. Once the layers of die board material are separated, the release material 137 can be peeled from the second layer of die board material, thereby exposing the pressure sensitive adhesive which can then be employer to band the second layer of die board material to the first upper surface 113.

To ensure proper alignment of the slots 116 between the first and second layers of die board material 134 and 136 respectively, an alignment pin 142 can be pressingly inserted into aperture 144 which is machined into and extends through the die board base prior to the separation of the first and second layers of die board material. While a single alignment pin 142 has been shown and described, the present invention is not limited in this regard as any number of alignment pins can be utilized without departing from the broader aspects of the present invention.

While the present invention has been shown and described as consisting of two (2) layers of die board material, the invention is not limited in this regard as two or more of layers of die board material can be employed, stacked one on top of the other and bonded together without departing from the broader aspects of the present invention.

Figure 6:
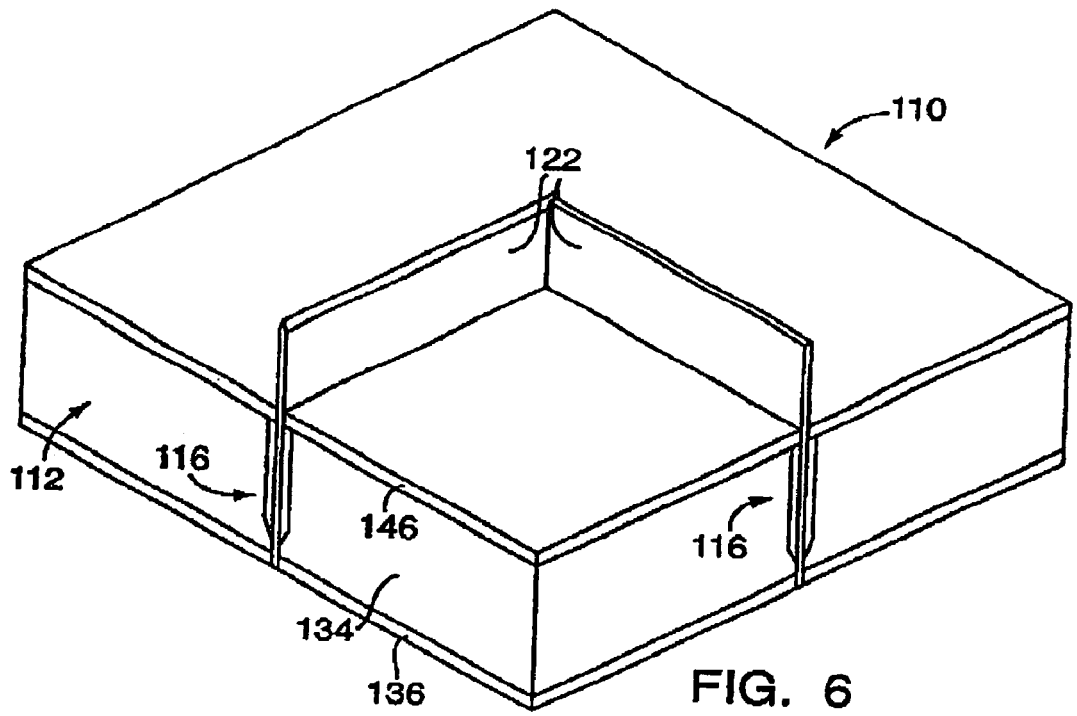
FIG. 6 is a perspective view of an embodiment of the die board of the present invention showing a laminated die board base comprised of three layers of die board material.

For example, and as shown in FIG. 6, three layers of die board material 134, 136, and 146 can be employed with the slots 116 in the second and third layers of die board material, 136 and 146 respectively corresponding to the second slot sections for grippingly retaining the die board rules 122. The slot 116 in the first layer of die board material 134 corresponds to the first slot section. While the slots 116 have been illustrated as being configured differently between the different layers of die board material, the present invention is not limited in this regard as each of the layers of die board material can include slots 116 having both the first and second slot sections, 18 and 20 respectively as shown in FIG. 1. In addition, each layer of die board material can be made from a different material, such as, but not limited to wood, plastic, or foam.

Figure 7:
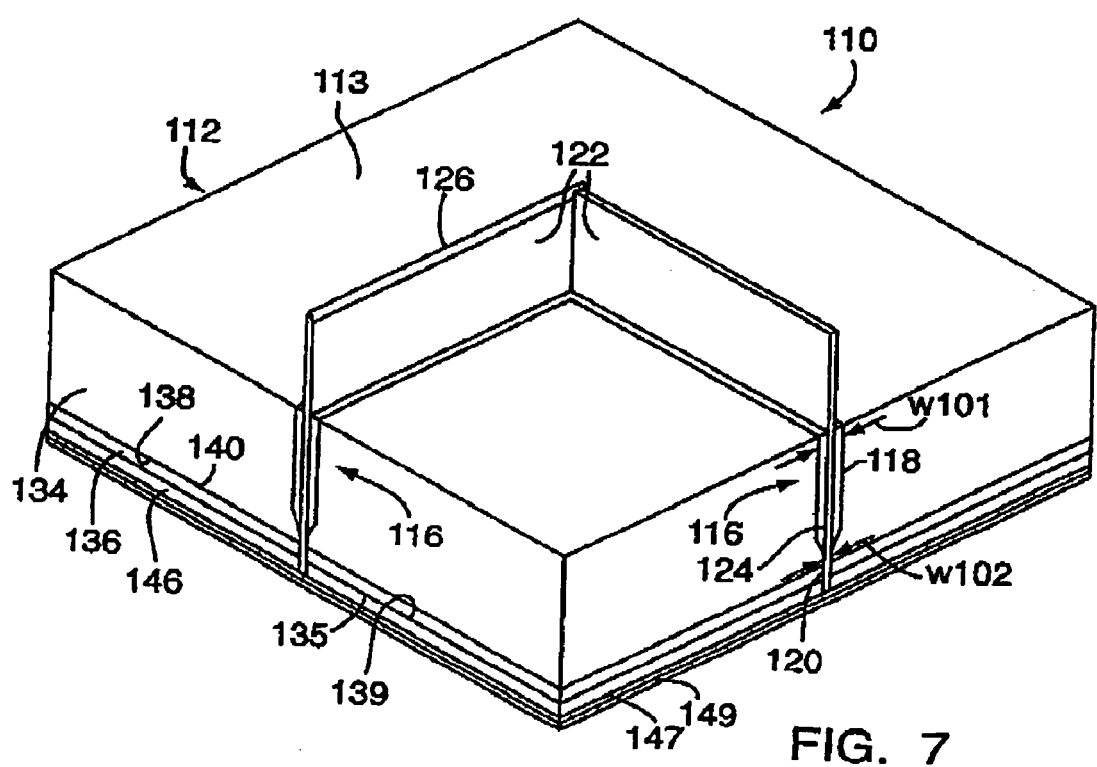
FIG. 7 is a perspective view of an embodiment of the die board of the present invention.

As shown in FIG. 7, the above-described three layer die board base 112 can be fabricated by providing a die board base wherein the first and second layers of die board material, 134 and 136 respectively are attached to one another as described above and illustrated in FIG. 4. The second layer of die board material 136 includes a fifth lower surface 137 releasably bonded via a layer of adhesive to a sixth upper surface 139 defined by the third layer of die board material 146. Once the slots 116 are cut through the die board base 112, the third layer of die board material 146 can be separated from the second layer of die board material. One of the fifth lower surface 137 or the sixth upper surface 139 has such release characteristics relative to the other that substantially all of the adhesive remains bonded to one of the layers of die board material.

Alternatively the adhesive can be of the low-tack type thereby providing for easy separation of the second and third layers of die board material. While adhesives have been describes as being employed to bond the layers of die board material together, the present invention is not limited in this regard as fasteners, such as, but not limited to screws, nails, and the like can be substituted without departing from the broader aspects of the present invention.

Once the layers of die board material have been separated, the third layer of die board material 146 can then be bonded to the first upper surface 113 of the first layer of die board material 134. A layer of pressure sensitive adhesive 147 can be bonded to the lower surface of the third layer of die board material and includes a layer of release material 139 adhered thereto. Once the second and third layers of die board material are separated, the release material 139 can be peeled from the third layer of die board material, thereby exposing the pressure sensitive adhesive which can then be employed to bond the second third of die board material to the first upper surface 113.

Figure 8:
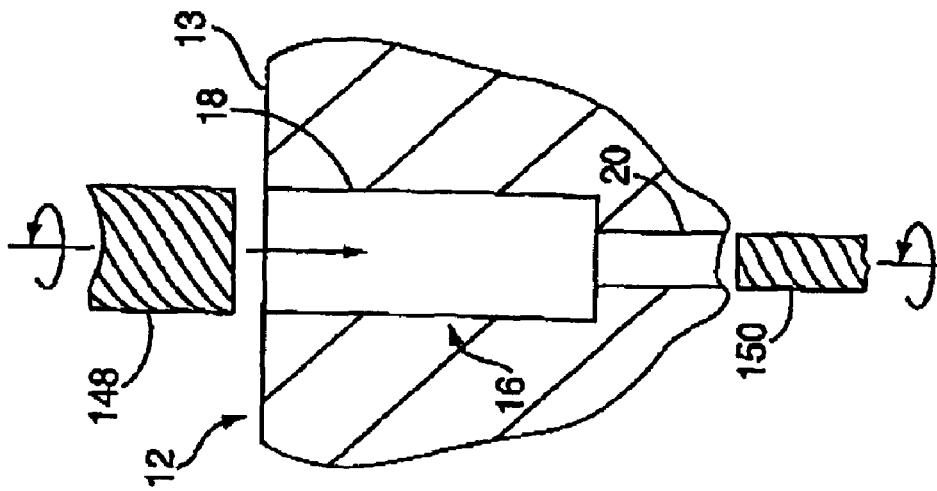
FIG. 8 is an enlarged partially cross sectional view of a slot in the die board base cut using two rotary cutters.
Figure 9:
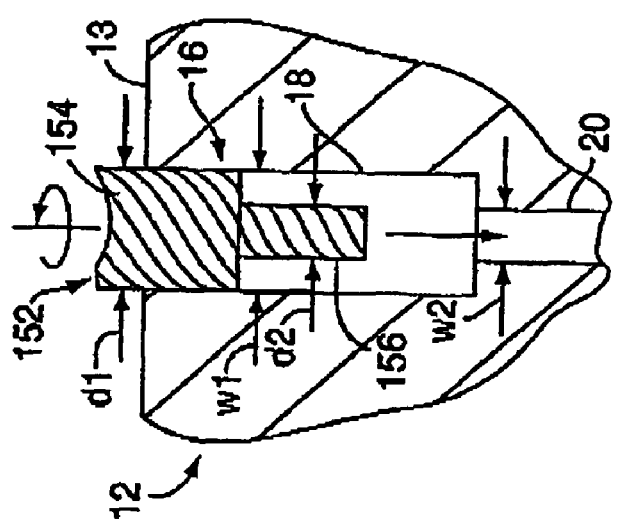
FIG. 9 is an enlarged partially cross sectional view of a slot in the die board base cut using a single rotary cutter.
Figure 10:
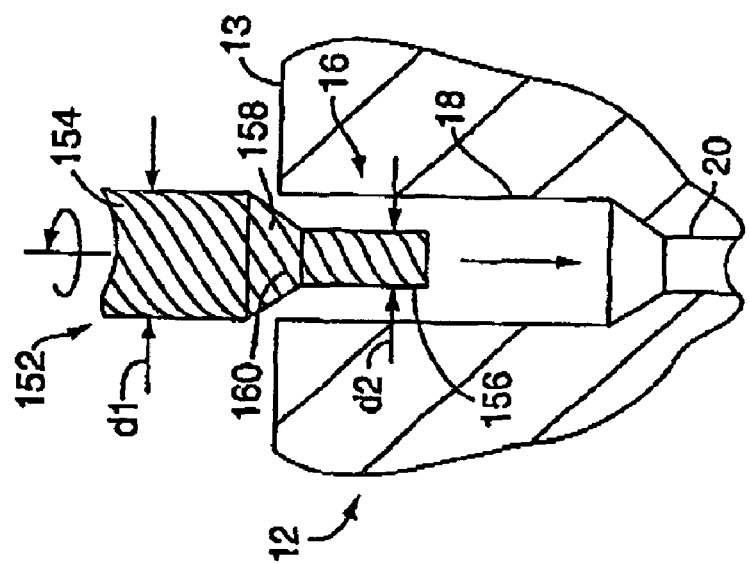
FIG. 10 is an enlarged partially cross sectional view of a slot in the die board base cut using a single rotary cutter.

The above-described embodiments of the die boards of the present invention are preferably fabricated using rotary cutting tools. As shown in FIGS. 8–10, various different rotary cutting tools can be employed without departing from the broader aspects of the present invention. As shown in FIG. 8, a first cutting tool 148 is mounted to an apparatus such as a router or a milling machine (not shown), and is used to cut the first slot section 18 into the die board base 12. The first slot section 18 extends from the first upper surface 13 part-way through the die board base 12. A second cutting tool 150 is used to cut the second slot section 20 into the die board base 12. The second slot section 20 extends from the second lower surface 14 and is in communication with the first slot section 18. While FIG. 8 illustrates the use of two rotary cutting tools 148 and 150, the present invention is not limited in this regard as any number of rotary cutting tools can be employed to generate the slots 16.

Alternatively, and as shown in FIG. 9, a single rotary cutting tool 152 can be used to generate the slot 16. The rotary cutting tool 152 is stepped and includes first cutting portion 154 defining a first outer diameter d1 equivalent to the width w1 of the first slot section 18, and a second cutting portion 156 defining a second outer diameter d2 equivalent to the width w2 of the second slot section 20 that is coaxial with the first cutting portion 154. Similarly and as shown in FIG. 10, the single rotary cutting tool 152 can include a tapered region 158 to smoothly transition between the first and second diameters, d1 and d2 respectively. The tapered region 158 includes cutting flutes 160 extending about its periphery, such that during a slot cutting operation the cutting tool 152 smoothly and cleanly cuts the slots 16 into the die board base 12. Helical cutting flutes 160 (as shown in FIGS. 9 and 10) that extend longitudinally along both the first cutting portion 154 and the second cutting portion 156 of the rotary cutting tool 152 have particular utility. While the die board base has been illustrated for simplicity in FIGS. 8–10 as being comprised of a single layer, the preset invention is not limited in this regard as the die board base 12 can be a laminate comprised of two or more layer of die board material without departing from the broader aspects of the present invention. In addition, while rotary cutting tools have been shown and described, the present invention is not limited in this regard as other type of cutting methods, such as sawing, employing a laser, or utilizing high-pressure water jets can be substituted without departing from the broader aspects of the present invention.

While preferred embodiments have been shown and described, various modifications and substitutions may be made without departing from the spirit and scope of the invention. Accordingly, it is to be understood that the present invention has been described by way of example, and not by limitation.

What is claimed is:

1. A rotary cutting tool for generating slots in die boards comprising:

a first cutting portion that is non-tapered and defining a first outer diameter, and a second cutting portion that is non-tapered and defining a second outer diameter extending from and coaxial with said first cutting portion, the second outer diameter being different from the first outer diameter;

said second cutting portion defining a generally cylindrical, outer peripheral surface; and wherein said first and second cutting portions each are defined in part by at least two helical cutting flutes extending longitudinally for generating different widths of the slots respectively in the die boards.

2. A rotary cutting tool as defined by claim 1 further including a tapered portion interposed between the first cutting portion and the second cutting portion, the tapered portion having a diameter that progressively decreases from the first outer diameter to the second outer diameter.

3. A rotary cutting tool as defined by claim 1 wherein said ist and second cutting portions are each generally cylindrical.

* * * * *